J. C. BECK.
PRIMING CUP FOR GASOLENE ENGINES.
APPLICATION FILED DEC. 12, 1910.
1,015,868.
Patented Jan. 30, 1912.
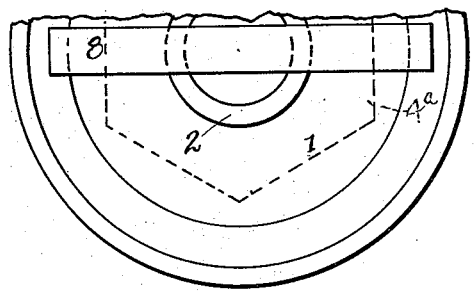
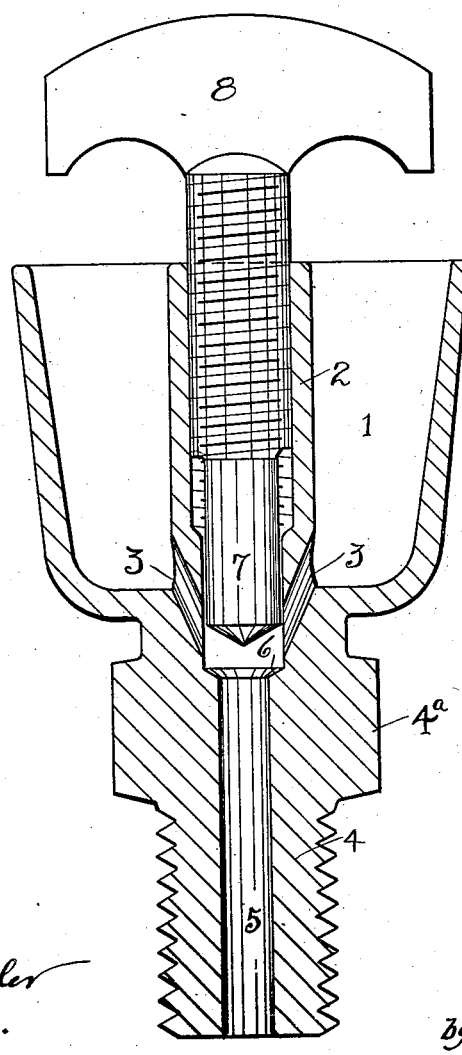

UNITED STATES PATENT OFFICE.

JOHN C. BECK, OF SEATTLE, WASHINGTON, ASSIGNOR OF ONE-HALF TO EDWARD E. BONN, OF KING COUNTY, WASHINGTON.

PRIMING-CUP FOR GASOLENE-ENGINES.

1,015,868.  Specification of Letters Patent.  Patented Jan. 30, 1912.

Application filed December 12, 1910. Serial No. 596,896.

*To all whom it may concern:*

Be it known that I, JOHN C. BECK, a citizen of the United States, and a resident of Seattle, in the county of King and State of Washington, have invented a certain new and useful Improvement in Priming-Cups for Gasolene-Engines, of which the following is a full, true, and exact specification.

The principal object of this invention is to provide a simple and effective device of this character in which all wear is compensated for and a gas tight joint between the explosion chamber of the engine and priming cup is always possible.

An important feature is that the movement of the thumb nut or other operating means, is within the vertical plane of the cup itself, thereby insuring easy access to the same at all times.

Still another important feature is that the thumb nut or other operating means is always comparatively cool.

Other objects will appear as the invention is more fully disclosed in the following specification and accompanying drawings in which—

Figure 1 is a central, longitudinal, sectional view of my improved priming cup. Fig. 2, a top view of the same with a portion broken away.

Referring now more particularly to the drawings, the numeral 1 designates the cup proper, which has the hollow, cylindrical central extension 2, the latter having the female threads around its inner surface, as shown, and the side openings 3, near its base which communicate with the cup 1. For convenience in securing the cup to the engine the upper portion of its stem 4 may be octagonal in shape as shown at 4ª, the lower end of the stem being threaded, as shown, to fit corresponding threads in the opening into the explosion chamber of the engine. The lower portion of the stem 4 has the central bore 5, which communicates with the hollow extension 2, and is of smaller diameter than the internal diameter of the latter. The internal surface of the extension 2, is chamfered or beveled as at 6 to meet the corresponding surface of the bore 5, the beveled portion 6, forming a seat for the valve plug 7. The lower end of the valve plug 7 is of smaller diameter than the internal diameter of the extension 2 and consequently does not contact therewith at any time. The upper end of the valve plug 7, has male threads which fit the female threads of the extension 2, and terminates in a thumb nut 8.

From the foregoing description it will be seen that a perfectly tight joint is always possible between the lower end of the valve plug 7, and its seat 6, despite any wear in either the end of the plug or the seat itself, thus effectively preventing any leakage of gas from the explosion chamber of the engine (not shown). It is plain that the thumb nut 8, will not readily become hot from the repeated explosions of the engine as the lower cylindrical portion of the plug 7 being smaller than the internal diameter of the extension 2 immediately surrounding it, is constantly surrounded by air which enters through the openings 3 and its upper threaded portion contacts only with the relatively thin walls of the extension 2, which, being considerably removed from the source of heat (the explosion chamber) is therefore little affected thereby. The fact that the thumb nut is always cool makes it possible at all times to operate the same quickly with the bare hands without danger of burning the same.

So far as I am aware, priming cups for gasolene engines, as heretofore known in the art, comprises a cup having an opening through its bottom and running thence through its stem, the opening being controlled by an ordinary stop cock with the usual taper core, the thumb nut or crank of the stop cock extending outside of the vertical plane of the cup. The objections to this form of priming cup are that the core of the cock must necessarily be below the cup, which brings it near to the lower end of the stem where the latter is secured to the explosion chamber. The continued explosions soon heat the lower end of the stem and finally the core of the cock as well as the thumb nut or crank upon the core, which not only causes inconvenience in operating the thumb nut or crank but causes the core of the cock to bake and stick in its bearings. Furthermore, any walls surrounding, intake pipes, spark plugs, or other obstacles adjacent to or connected with the engine, often render access to the thumb nut difficult as the latter projects beyond the side of the cup. In my improved device, wherever there is room for the cup there is also room to operate the thumb nut as the movement of the latter is entirely within the vertical plane of the former.

While I have shown an annular ventilated air space around the lower end of the valve plug 7, it is obvious that even without this air space, an important advantage exists as regards heating of the thumb nut, in that not only is almost the entire body of the plug surrounded by the comparatively thin walls of the extension 2, but the same is much farther away from the source of heat than would be the case if an ordinary stop cock were used in the stem below the cup as herein above described.

While I have shown and described a particular form of embodiment of my invention I am fully aware that many minor changes in construction and the arrangement of the parts will readily suggest themselves to others skilled in the art, and I do not therefore desire to be limited to the exact form of embodiment herein shown and described.

Having described my invention what I claim as new and desire to protect by Letters Patent of the United States is—

A priming device for gasolene engines comprising an open cup having a tubular stem threaded to fit an opening into the explosion chamber of the engine, an internally threaded tubular extension within said cup the internal diameter of which is greater than that of said tubular stem, whereby a valve seat is formed, a plurality of side openings from the cup into said tubular extension and above said valve seat, a valve plug having its upper end threaded to fit the threaded portion of said tubular extension and its lower end of smaller diameter than the internal diameter of the lower portion of said extension immediately surrounding said plug, whereby an annular cooling chamber is formed around the lower end of the plug, a thumb nut upon the upper end of said valve plug, the movement of which is within the vertical plane of said cup.

JOHN C. BECK.

Witnesses:
FRED P. GORIN,
M. E. BREWER.

---

Copies of this patent may be obtained for five cents each, by addressing the "Commissioner of Patents, Washington, D. C."